United States Patent
Lu et al.

(10) Patent No.: US 8,948,484 B2
(45) Date of Patent: Feb. 3, 2015

(54) METHOD AND SYSTEM FOR AUTOMATIC VIEW PLANNING FOR CARDIAC MAGNETIC RESONANCE IMAGING ACQUISITION

(75) Inventors: Xiaoguang Lu, West Windsor, NJ (US); Jens Guehring, Erlangen (DE); Marie-Pierre Jolly, Hillsborough, NJ (US); Bogdan Georgescu, Plainsboro, NJ (US); Carmel Hayes, München (DE); Peter Speier, Erlangen (DE); Michaela Schmidt, Uttenreuth (DE); Xiaoming Bi, Aurora, IL (US); Randall Kroeker, Winnipeg (CA); Dorin Comaniciu, Princeton Junction, NJ (US); Edgar Mueller, Heroldsbach (DE)

(73) Assignees: Siemens Corporation, Iselin, NJ (US); Siemens Aktiengesellschaft, Munich (DE); National Institutes of Health, Rockville, MD (US); Siemens Canada Limited, Burlington, Ontario (CA); Siemens Medical Solutions USA, Inc., Malvern, PA (US)

( * ) Notice: Subject to any disclaimer, the term of this patent is extended or adjusted under 35 U.S.C. 154(b) by 504 days.

(21) Appl. No.: 13/293,239

(22) Filed: Nov. 10, 2011

(65) Prior Publication Data
US 2012/0121152 A1 May 17, 2012

Related U.S. Application Data

(60) Provisional application No. 61/412,479, filed on Nov. 11, 2010.

(51) Int. Cl.
- *G06K 9/00* (2006.01)
- *G06K 9/68* (2006.01)
- *G06K 9/62* (2006.01)

(52) U.S. Cl.
CPC ............ *G06K 9/6857* (2013.01); *G06K 9/6282* (2013.01)
USPC .......................................... 382/131; 382/173

(58) Field of Classification Search
CPC ........... G06T 2207/10088; G06T 2207/10028; G06T 7/0079–7/0097
USPC ......................................... 382/100, 128–131
See application file for complete search history.

(56) References Cited

U.S. PATENT DOCUMENTS 6,268,730 B1 * 7/2001 Du ................................ 324/309
7,355,406 B2    4/2008 Mayer et al.

(Continued)

OTHER PUBLICATIONS

Lelieveldt, B.P.F. et al., "Automated Observer-Independent Acquisition of Cardiac Short-Axis MR Images: A Pilot Study", Radiology 221, 537-542 (2001).

(Continued)

*Primary Examiner* — Shefali Goradia

(57) ABSTRACT

A method and system for automated view planning for cardiac magnetic resonance imaging (MRI) acquisition is disclosed. The method and system automatically generate a full scan prescription using a single 3D MRI volume. The left ventricle (LV) is segmented in the 3D MRI volume. Cardiac landmarks are detected in the automatically prescribed slices. A full scan prescription, including a short axis stack and 2-chamber, 3-chamber, and 4-chamber views, is automatically generated based on cardiac anchors provided by the segmented left ventricle and the detected cardiac landmarks in the 3D MRI volume.

31 Claims, 6 Drawing Sheets

(56) References Cited

U.S. PATENT DOCUMENTS

| | | | |
|---|---|---|---|
| 7,423,430 B1* | 9/2008 | Sharif et al. | 324/309 |
| 7,613,500 B2* | 11/2009 | Vass et al. | 600/427 |
| 7,864,997 B2* | 1/2011 | Aben | 382/128 |
| 7,916,919 B2 | 3/2011 | Zheng et al. | |
| 8,195,292 B2* | 6/2012 | Rosenberg et al. | 607/9 |
| 2006/0224062 A1* | 10/2006 | Aggarwal et al. | 600/413 |
| 2009/0290776 A1* | 11/2009 | Sun et al. | 382/131 |
| 2010/0215238 A1* | 8/2010 | Lu et al. | 382/131 |
| 2010/0310145 A1* | 12/2010 | Hashimoto et al. | 382/131 |
| 2011/0210734 A1 | 9/2011 | Darrow et al. | |
| 2011/0228998 A1 | 9/2011 | Vaidya et al. | |

OTHER PUBLICATIONS

Lu, et al., "Cardiac Anchoring Through Context Modeling", Proc. International conference on Medical Image Computing and Computer Assisted Intervention (MICCAI), LNCS 6361, pp. 383-390, 2010.

* cited by examiner 502  504  506  508
510  512  514  516
Short axis stack

600

A3C

METHOD AND SYSTEM FOR AUTOMATIC VIEW PLANNING FOR CARDIAC MAGNETIC RESONANCE IMAGING ACQUISITION

This application claims the benefit of U.S. Provisional Application No. 61/412,479, filed Nov. 11, 2010, the disclosure of which is herein incorporated by reference.

BACKGROUND OF THE INVENTION

The present invention relates to medical imaging of the heart, and more particularly, to automatic view planning for magnetic resonance imaging of the heart.

Accurate morphological and functional measurements of the heart are essential in clinical applications for diagnosis, prognostic, and therapeutic decisions. Magnetic Resonance Imaging (MRI) allows for precise morphological characterization of heart structures. Advances in cardiac imaging techniques have made it possible to obtain high resolution images of the complete cardiac cycle. In recent years, there has been a great deal of efforts focused on developing and improving techniques for automatic cardiac segmentation. However, less attention has been paid to automatic and fast planning for cardiac MRI acquisition, which remains challenging in clinical practice.

During conventional cardiac MRI acquisition, anchoring the heart is typically performed using a multi-step approach involving the acquisition of double-oblique slices in order to localize the long and short axes of the heart. Based on those localizers, the standard heart views (e.g., 2-chamber, 3-chamber, 4-chamber, and short-axis views from base to apex) are planned. This approach is operator dependent and time consuming. For example, a typical cardiac MRI planning protocol begins with capturing coronal localizer images, followed by multi-slice localizers at different orientations in order to align the left ventricle (LV) with the isocenter of the scanner. Next, one vertical long-axis localizer is planned on a transversal slice and one horizontal long-axis localizer is planned on a vertical long-axis view, from which a few short-axis views are planned. Based on the short-axis views 2-chamber, 3-chamber, and 4-chamber views are planned. Finally, the short axis stack is planned on the 4-chamber view. This protocol requires detailed knowledge of the heart for operators to manually plan the views at every step of the process, while the patient remains in the MRI scanner.

BRIEF SUMMARY OF THE INVENTION

The present invention provides a method and system for automatic view planning for cardiac magnetic resonance imaging (MRI) acquisition. Embodiments of the present invention provide a fully automated method for prescribing a short-axis stack and standard long axis view, including 2-chamber, 3-chamber, and 4-chamber views, from a single 3D MR volume for cardiac MRI acquisition. Embodiments of the present invention utilize machine learning techniques to localize and delineate cardiac anatomies in a 3D volume and to detect a set of cardiac landmarks to anchor chambers of the heart in order to prescribe the various views.

In one embodiment of the present invention, a left ventricle (LV) is segmented in the 3D MRI volume, and a scan prescription for cardiac MRI acquisition is automatically generated based on cardiac anchor points provided by the segmented LV in the 3D MRI volume. A short axis stack can be prescribed based on the cardiac anchor points provided by the segmented LV. A 3-chamber view scanning plane can be determined based on the cardiac anchor points provided by the segmented LV. Landmarks can be detected in a mid-ventricular short axis slice reconstructed from the 3D MRI volume and corresponding to a short axis slice prescribed in the short axis stack, and a 2-chamber view scanning plane and a 4-chamber view scanning plane can be determined based on the landmarks detected in the reconstructed mid-ventricular short axis slice.

These and other advantages of the invention will be apparent to those of ordinary skill in the art by reference to the following detailed description and the accompanying drawings.

DETAILED DESCRIPTION

The present invention is directed to a method and system for automatic view planning for cardiac magnetic resonance imaging (MRI) acquisition. Embodiments of the present invention are described herein to give a visual understanding of the MRI scan planning method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

As parallel MRI techniques have rapidly advanced, single breath-hold acquisitions with full chest coverage have become feasible. Instead of acquiring a series of 2D localizer slices with operator interventions, a direct approach to prescribing the clinically relevant slices in a fully automated fashion from a single acquisition is highly beneficial. However, this is a challenging task because in order to be clinically viable, a robust approach is required for differentiating the heart from other complex anatomical structures in a full-chest volume, accounting for large variations across populations, and with a quick response time.

Embodiments of the present invention provide a fully automatic method for prescribing a short-axis stack and standard long-axis view, including 2-chamber, 3-chamber, and 4-chamber views, from a single 3D MR volume for cardiac MRI acquisition. Embodiments of the present invention utilize machine learning based methods to localize and delineate cardiac anatomies in a 3D volume, and detect a set of cardiac landmarks to anchor chambers in order to prescribe the views.

Figure 1:
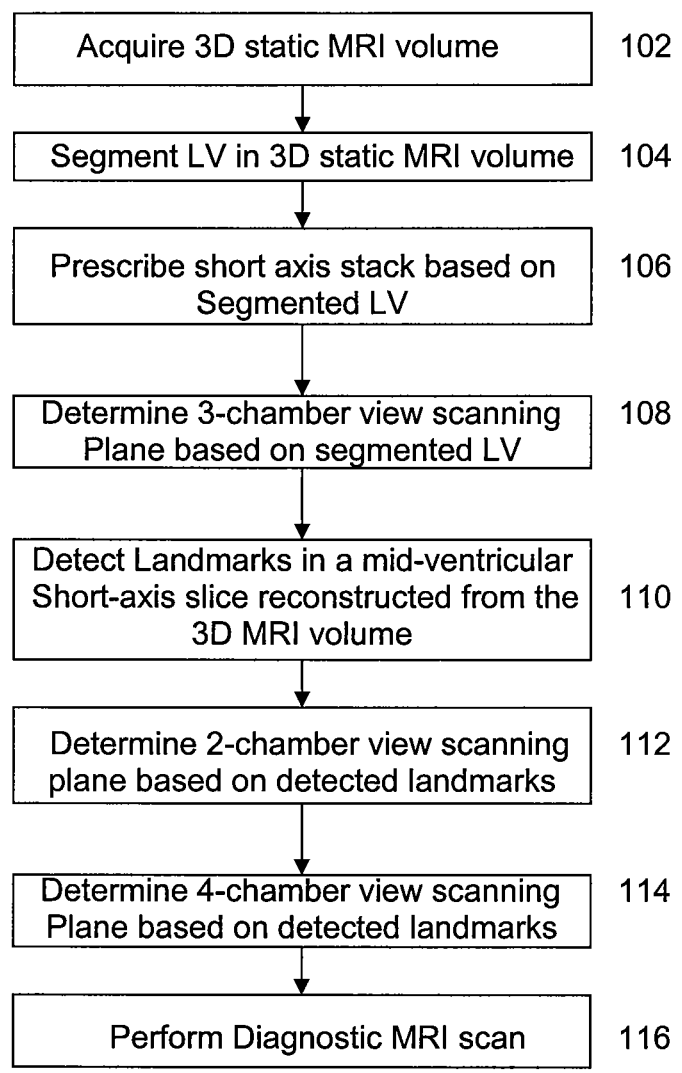
FIG. 1 illustrates a method for automatically prescribing a cardiac MRI scan according to an embodiment of the present invention.
Figure 2:
FIG. 2 illustrates an exemplary full-chest MRI volume.

FIG. 1 illustrates a method for automatically prescribing a cardiac MRI scan according to an embodiment of the present invention. The method of FIG. 1 utilizes a single initial 3D MRI volume and transforms the initial 3D volume in order to automatically plan views for a diagnostic high resolution cardiac MRI scan. In addition to being high resolution the diagnostic scan can be time resolved MRI scan that results in a temporal sequence of MR images. As illustrated in FIG. 1, at step 102, a static 3D MRI volume is acquired. The 3D volume can be any 3D volume containing the heart. In an advantageous implementation the 3D volume is a 3D volume acquired at a lower resolution than the resolution used for a diagnostic MRI scan. According to one embodiment, the 3D volume can be a single breath-hold acquisition with full chest coverage acquired using 3D parallel MR imaging. The use of parallel imaging techniques allow the 3D volume to be acquired quickly while a patient holds his breath. However, the present invention is not limited thereto, and the 3D volume may also be acquired using multiple slice imaging. In this case, in order to increase acquisition speed, a large inter-slice distance may be used in the acquisition of the slices using to reconstruct 3D volume. In the case of multiple slice imaging, the 3D volume can be reconstructed through interpolation. Even with a large inter-slice distance, this can be a good tradeoff between acquisition speed and quality. The 3D MRI volume may be acquired using an MRI scanner. FIG. 2 illustrates an exemplary full-chest MRI volume 200. The MRI volume 200 of FIG. 2 is a static MRI volume acquired in a single breath-hold using 3D parallel imaging.

Figure 3:
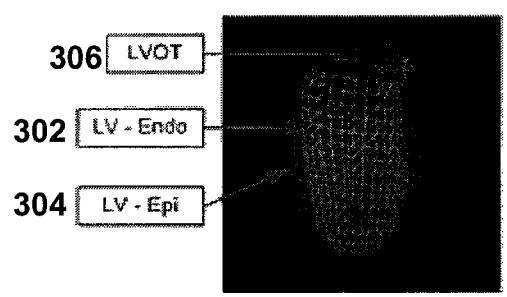
FIG. 3 illustrates a mesh model for the left ventricle (LV)

Returning to FIG. 1, at step 104, the left ventricle (LV) is segmented in the 3D MRI volume. According to an advantageous embodiment, machine learning methods are used for segmenting the LV in the 3D volume. For example, the method described in U.S. Pat. No. 7,916,919, which is incorporated herein by reference, may be used to segment the LV in the 3D volume. A mesh representation of the anatomical shape of the LV is generated using a database of 3D training volumes that are manually annotated. FIG. 3 illustrates a mesh model for the LV. As illustrated in FIG. 3, the anatomically accurate model 300 for the LV includes the LV endocardium 302, the LV epicardium 304, and the left ventricle outflow tract (LVOT) 306. The LV model 300 is a triangular mesh. The LV model 300 is generated based on a database of 3D training volumes and is fit to the acquired 3D MRI volume to delineate the corresponding anatomical structures in the 3D MRI volume.

Segmentation of the LV by fitting an LV model to the 3D MRI volume can be performed in two stages. First, the LV pose (i.e., position, orientation, and scale) is estimated in the 3D MRI volume at an LV localization stage. Then, at a delineation stage, local deformations of the LV model with the estimated pose are applied in order to fit the model to LV boundaries in the 3D MRI volume.

In order to estimate the LV pose in the 3D MRI volume, it is necessary to solve for the nine-parameter space, including three translations, three orientations, and three scales. According to an advantageous implementation, a series of learned based detectors are trained in order to perform the LV pose estimation in a series of marginal spaces with increasing dimensionality. Accordingly, the idea of this marginal space learning (MSL) is not to learn a classifier directly in the full similarity transformation space, but to incrementally learn classifiers in the series of marginal spaces. As the dimensionality increases, the valid space region becomes more restricted by previous marginal space classifiers. The 3D LV pose detection is split into three stages: position (translation) estimation, position-orientation estimation, and position-orientation-scale estimation. A separate detector is trained based on the annotated training volumes for each of these stages. Multiple hypotheses are maintained between the stages, which quickly removes false positives at earlier stages while propagating the correct hypotheses to the final stage. One hypothesis is selected as the final detection result. This LV localization stage results in an estimated transformation (position, orientation, and scale) of the object, and a mean shape of the LV (i.e., the LV model generated based on the training volumes) is aligned with the 3D volume using the estimated transformation.

A large database of 3D training volumes with the LV annotated is maintained. For each detector, a set of positive and negative training samples are extracted from the database of annotated training volumes with the positive samples as the true targets (close to the ground truth) and the negative samples as others (far away from the ground truth). The detection task fro each detector is a binary classification. The series of the detectors used to estimate the LV pose and extract the LV boundaries can be constructed using probabilistic boosting trees (PBT), which select from a large pool of features a set of discriminative features that are used to distinguish the positive and negative samples. Such a classifier is a tree-based structure which calculates the posterior probability of the presence of the object of interest from the given data. The nodes in the tree are constructed by a non-linear combination of simple classifiers using boosting techniques. For the detector at the translation (position) stage, 3D Haar wavelet-like features, which are calculated efficiently using integral image-based techniques, can be used. For the detectors at the position-orientation and the position-orientation-scale stages, steerable features can be used, whose computation does not require volume rotation and re-scaling, which are computationally expensive, especially when the hypothesis search space is large. The boundary detectors can also use steerable features.

Figure 4:
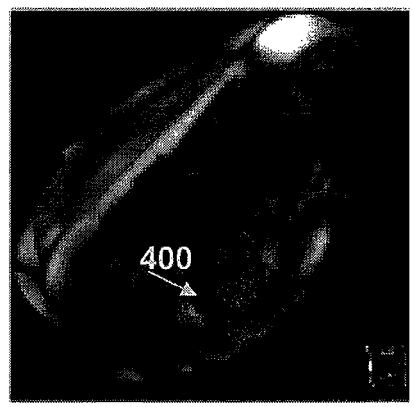
FIG. 4 illustrates an exemplary LV segmentation result.

Once the LV model pose is estimated in the 3D MRI volume, the mean shape (i.e., average LV model of all of the annotated training volumes) is aligned with the 3D MRI volume using the estimated LV pose to generate an initial estimate of the object shape in the 3D MRI volume. In order to capture the true anatomical morphology of the LV shape, the LV model is deformed by searching the boundary for each vertex of the LV model. The boundary hypotheses are taken along the normal directions at each vertex of the mean model. Detection is achieved using a boundary detector trained using a PBT with steerable features. The detected boundary points are constrained by projecting the detected model onto a shape subspace constructed based on the annotated dataset using principal component analysis. As a result the mesh model of the LV is fit to the 3D MRI volume to segment the LV. FIG. 4 illustrates an exemplary LV segmentation result. As shown in FIG. 4, an LV model 400 is segmented in the MRI volume 200 of FIG. 2.

Returning to FIG. 1, at step 106, a short axis stack is prescribed based on the segmented LV. The short axis stack refers to a series of slices taken in planes perpendicular to the long axis of the LV during the diagnostic MRI scan. These short axis slices range from the base of the LV to the apex of the LV are typically separated by 1-4 mm intervals. Once the LV is delineated in the 3D MRI volume, cardiac anchors are calculated based on the LV. In the LV mesh model fit to the 3D MRI volume, the LV base and apex have corresponding vertices. The LV base center is calculated as the centroid of the vertices on the LV base. The LV long axis is detected by connecting the LV base center and the apex. The entire short axis stack can then be planned from the LV base to the apex.

Figure 5:
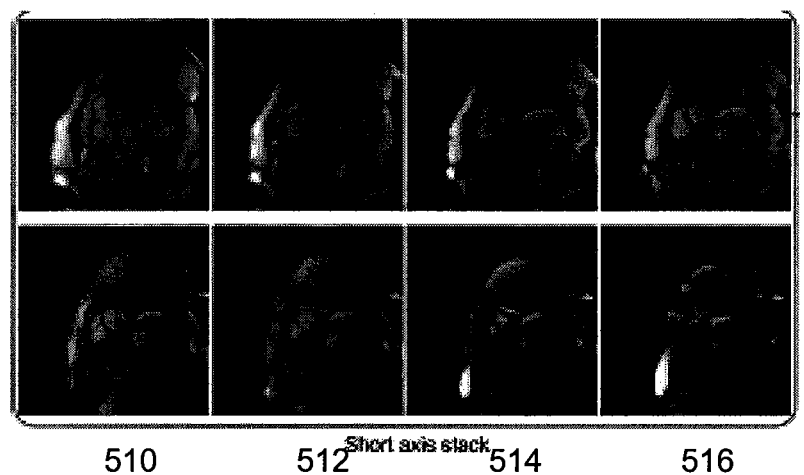
FIG. 5 illustrates an exemplary short axis stack.

In particular, viewing parameters (e.g., position and normal direction) for each slice in the short axis stack are determined based on detected LV long axis in the 3D MRI volume. Although an advantageous embodiment is described above in which the LV long axis is detected by connected the LV base center and the LV apex based on the LV mesh, the present invention is not limited thereto. For example, other methods for detecting the LV long axis may be used as well, such as fitting a line across centers of a set of short axis multiplanar reconstruction (MPR) slices reconstructed from the 3D MRI volume. FIG. 5 illustrates an exemplary short axis stack 500 acquired using a short axis stack prescription determined based on the LV segmentation 400 of FIG. 4. As shown in FIG. 5, the short axis stack 500 includes a set of slices 502, 504, 506, 508, 510, 512, 514, and 516 that are orthogonal to an LV long axis.

Figure 6:
FIG. 6 illustrates an exemplary 3-chamber view.

Returning to FIG. 1, at step 108 a 3-chamber view scanning plane is determined based on the segmented LV. The 3-chamber view or apical 3-chamber (A3C) view is a view showing the LV, aorta, and left atrium (LA) in the same plane. The segmentation of the LV provides anchor points that provide a position and orientation of the A3C view scanning plane. In particular, the LV base, LV apex, and LVOT have corresponding vertices in the LV mesh fitted to the 3D MRI volume. The LVOT provides a position for aorta. The LV base center, LV apex, and LVOT points determined by the segmented LV mesh define the A3C scanning plane. FIG. 6 illustrates a 3-chamber (A3C) view MRI slice 600 acquired using the 3-chamber view scanning plane determined based on the LV segmentation 400 of FIG. 4.

Returning to FIG. 1, at step 110, landmarks are detected in a mid-ventricular short axis slice reconstructed from the 3D MRI volume. The mid-ventricular short axis slice can correspond to one of the slices prescribed in the short axis stack. For example, the mid-ventricular short axis slice can correspond to a short axis slice in the short axis stack positioned at one quarter of the distance from the base to the apex. The mid-ventricular short axis slice is reconstructed from the 3D MRI volume using MPR. According to an advantageous embodiment, the landmarks detected in the reconstructed mid-ventricular short axis slice are the anterior and inferior right ventricle (RV) insertion points and the RV lateral point.

In an advantageous implementation, the RV insertion points and the RV lateral points are detected using the method described in Lu et al., "Cardiac Anchoring Through Context Modeling," *Proc. International Conference on Medical Image Computing and Computer Assisted Intervention* (*MICCAI*), *LNCS* 6361, pp. 383-390, 2010, which is incorporated herein by reference. In particular, the RV insertion points and RV lateral points are converted into parameterized bounding box representations, which fit into an object detection framework. Such a representation embeds not only the individual anchoring components but also their context, which contains rich information to distinguish the anchoring components from their background and other anatomical structures. A learning-based method is applied to train detectors on expert annotations for anchoring the points (i.e., RV insertion points and RV lateral point). A 2D object (bounding box) parameter set consists of five degrees of freedom. Exhaustively searching in this 5-dimensional space is prohibitive for online applications. Therefore, a marginal space search strategy is utilized, in which a series of detectors are used that estimate plane parameters at a number of sequential stages in the order of complexity, i.e., translation, orientation, and scale, as the parameter degrees of freedom increase. A PBT can be used for each detector to achieve a discriminative classification between the object and background. Each detector selects from a large pool of features a set of discriminative features that are used to distinguish the object from background. For the classifiers at the translation stage, Haar wavelet-like features can be used, which are efficiently calculated using integral image-based techniques. For the classifiers at the orientation and scale stages, steerable features can be applied, because their computation does not require image rotation and re-scaling, which are computationally expensive, especially when the hypothesis search space is large.

The context for the RV insertion points and the RV lateral point are modeled based on the annotated training data to form bounding boxes. For the RV insertion points, the anterior and posterior anchors are identified through the following context modeling. Let $\langle x_{an}, y_{an} \rangle$ $\langle x_{po}, y_{po} \rangle$, $\langle x_{La}, y_{La} \rangle$ denote the positions of the RV insertion anterior, RV insertion posterior, and RV lateral, respectively. The contextual parameter set for the RV insertion points is: positions $\{(x_{an}+x_{po})/2, (y_{an}+y_{po})/2\}$; orientation {orthogonal to the line segment connecting RV insertion anterior and RV insertion posterior, and pointing toward the LV}; and scales $\{s_{ins}, s_{ins}\}$, where $s_{ins} = \sqrt{(x_{an}-x_{po})^2 + (y_{an}-y_{po})^2} * \beta$. $\beta$ is a constant used to adjust the size of the bounding box. In a possible implementation, $\beta$ may be set to 1.5. For the RV lateral point, in order to utilize its RV context, the context parameters can be constructed as: positions $\{(x_{La}+x_{po})/2, (y_{La}+y_{po})/2\}$; orientation {orthogonal to the line segment connecting the RV lateral point and the posterior RV insertion point, and pointing toward the RV insertion anterior side}; and scales $\{s_{La}, s_{La}\}$ where $s_{La} = \sqrt{((x_{La}-x_{po})^2 + (y_{La}-y_{po})^2)} * \gamma$. $\gamma$ is a constant used to adjust the size of the bounding box. In a possible implementation, $\gamma$ may be set to 2.4.

Figure 7:
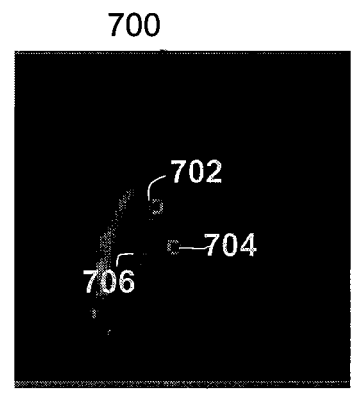
FIG. 7 illustrates exemplary landmark detection in a reconstructed mid-ventricular short axis slice.

Bounding boxes in the annotated training data generated using the contexts described above are used to train a series of detectors for detection of the RV insertion points and a series of detectors for detection of the RV lateral point. The trained detectors are used to detect a bounding box for the RV insertion points and a bounding box for the RV lateral point in the reconstructed mid-ventricular short axis slice. The locations of the anterior and posterior RV insertion points and the RV lateral point in the reconstructed mid-ventricular short axis slice is then determined from the detected bounding boxes using the above described context models. FIG. 7 illustrates exemplary landmark detection in a reconstructed mid-ventricular short axis slice 700. As shown in FIG. 7, the RV insertion points 702 and 704 and the RV lateral point 706 are detected in the reconstructed mid-ventricular short axis slice 700.

Figure 8:
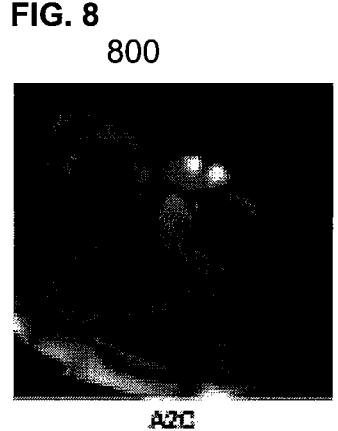
FIG. 8 illustrates an exemplary 2-chamber view.

Returning to FIG. 1, at step 112, the 2-chamber view scanning plane is determined based on the detected landmarks. The 2-chamber view or apical 2-chamber (A2C) scanning plane is calculated to be in parallel to a line connecting the two RV insertion points, and crosses the LV apex and LV blood pool center that lies on the reconstructed mid-ventricular short axis slice used for landmark detection. The LV blood pool center is determined by the segmented LV mesh. FIG. 8 illustrates an exemplary 2-chamber view 800 acquired using a 2-chamber view scanning planed determined based on the detected landmarks.

Figure 9:
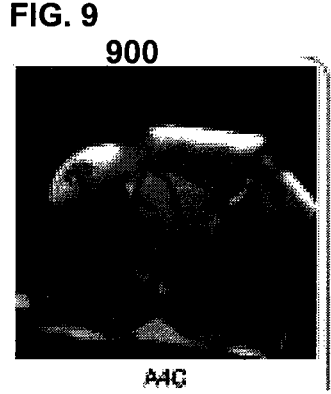
FIG. 9 illustrates and exemplary 4-chamber view.

Returning to FIG. 1, at step 114, the 4-chamber view scanning plane is determined based on the detected landmarks. The 4-chamber view or apical 4-chamber (A4C) scanning plane is calculated as a plane that crosses the LV blood pool center, LV apex, and the RV lateral point. FIG. 9 illustrates and exemplary 4-chamber view 900 acquired using a 4-chamber view scanning planed determined based on the detected landmarks.

Returning to FIG. 1, at step 116, a diagnostic MRI scan is performed using the determined scan prescription. That is, parameters for the prescribed short axis stack, and the 2-chamber, 3-chamber, and 4-chamber views determined using the single 3D MRI volume acquired at step 102 are stored as a MRI scan prescription, and the diagnostic scan is performed using the scan prescription. The diagnostic MRI scan can be a series high resolution MRI scans that acquire the prescribed short axis stack and the 2-chamber, 3-chamber, and 4-chamber views using the scanning planes determined in steps 106, 108, 112, and 114. The diagnostic scan results can be displayed, for example on a display device of a computer system.

Figure 10:
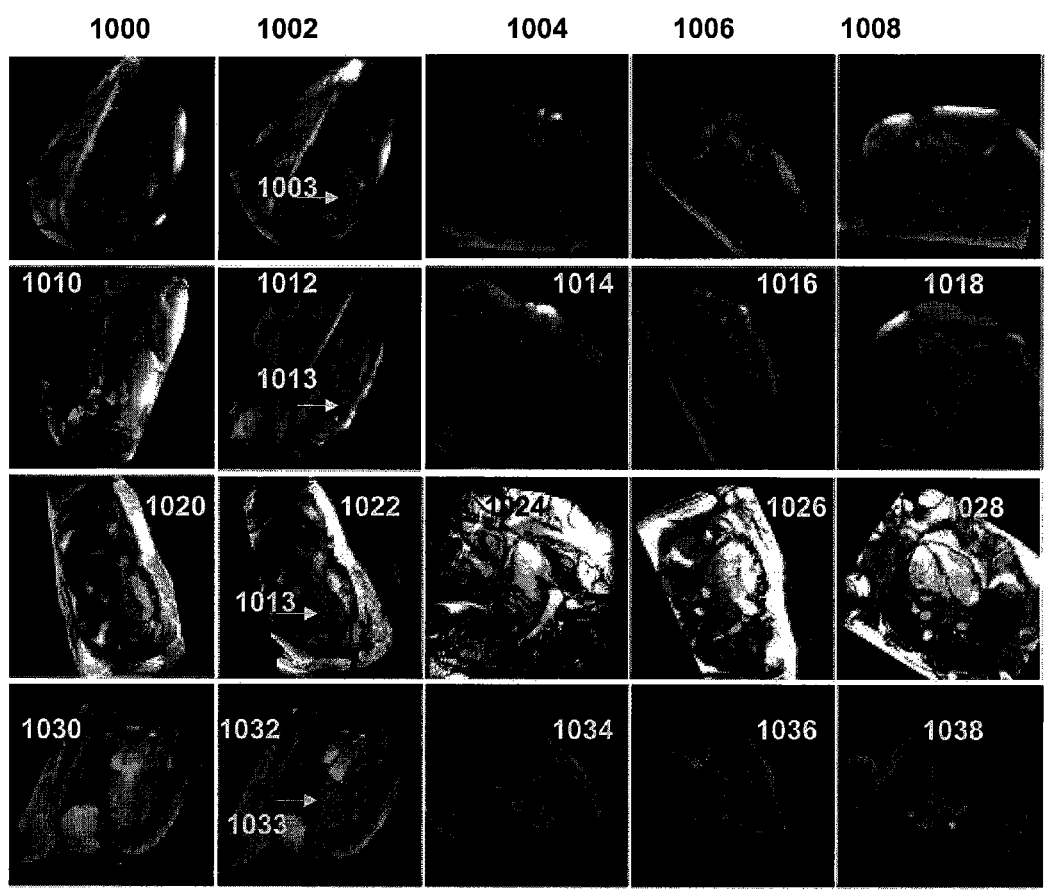
FIG. 10 illustrates exemplary results of the method of FIG. 1.

FIG. 10 illustrates exemplary results of the method of FIG. 1. As illustrated in FIG. 10, image 1000 shows an original 3D volume, image 1002 shows the LV segmentation 1003 for the original 3D volume 1000, and images 1004, 1006, and 1008 show the prescribed 2-chamber, 3-chamber, and 4-chamber views, respectively, determined from the original 3D volume 1000 using the method of FIG. 1. Image 1010 shows an original 3D volume, image 1012 shows the LV segmentation 1013 for the original 3D volume 1010, and images 1014, 1016, and 1018 show the prescribed 2-chamber, 3-chamber, and 4-chamber views, respectively, determined from the original 3D volume 1010 using the method of FIG. 1. Image 1020 shows an original 3D volume, image 1022 shows the LV segmentation 1023 for the original 3D volume 1020, and images 1024, 1026, and 1028 show the prescribed 2-chamber, 3-chamber, and 4-chamber views, respectively, determined from the original 3D volume 1020 using the method of FIG. 1. Image 1030 shows an original 3D volume, image 1032 shows the LV segmentation 1033 for the original 3D volume 1030, and images 1034, 1036, and 1038 show the prescribed 2-chamber, 3-chamber, and 4-chamber views, respectively, determined from the original 3D volume 1030 using the method of FIG. 1.

Figure 11:
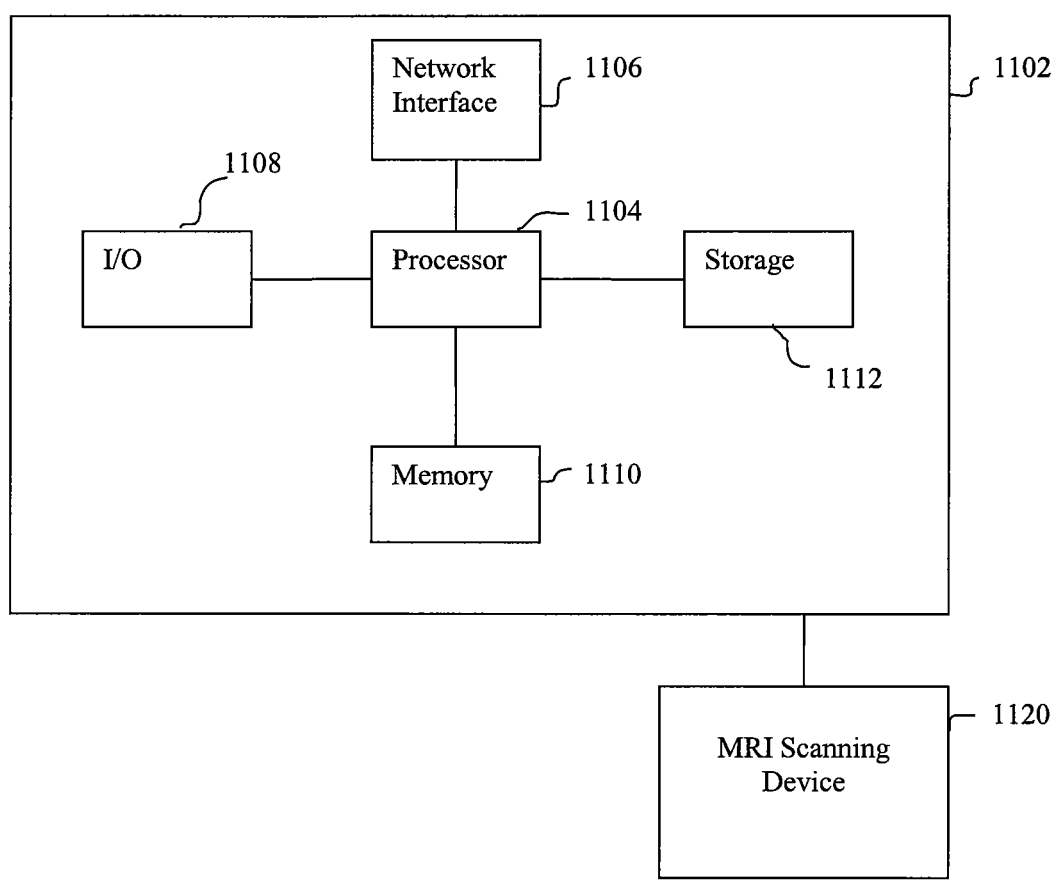
FIG. 11 is a high level block diagram of a computer capable of implementing the present invention.

The above-described methods for automatic view planning for cardiac MRI acquisition may be implemented on a computer using well-known computer processors, memory units, storage devices, computer software, and other components. A high level block diagram of such a computer is illustrated in FIG. 11. Computer 1102 contains a processor 1104 which controls the overall operation of the computer 1102 by executing computer program instructions which define such operation. The computer program instructions may be stored in a storage device 1112, or other computer readable medium (e.g., magnetic disk, CD ROM, etc.) and loaded into memory 1110 when execution of the computer program instructions is desired. Thus, the steps of the method of FIG. 1 may be defined by the computer program instructions stored in the memory 1110 and/or storage 1112 and controlled by the processor 1104 executing the computer program instructions. An MR scanning device 1120 can be connected to the computer 1102 to input MRI images to the computer 1102. It is possible to implement the MR scanning device 1120 and the computer 1102 as one device. It is also possible that the MR scanning device 1120 and the computer 1102 communicate wirelessly through a network. The computer 1102 also includes one or more network interfaces 1106 for communicating with other devices via a network. The computer 1102 also includes other input/output devices 1108 that enable user interaction with the computer 1102 (e.g., display, keyboard, mouse, speakers, buttons, etc.). One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for automated view planning for cardiac magnetic resonance imaging (MRI) acquisition based on a single 3D MRI volume, comprising:
   segmenting a left ventricle (LV) in the 3D MRI volume; and
   automatically generating a scan prescription for cardiac MRI acquisition based on cardiac anchor points provided by the segmented LV in the 3D MRI volume, wherein the step of automatically generating a scan prescription for cardiac MRI acquisition based on cardiac anchor points provided by the segmented LV in the 3D MRI volume comprises:
   prescribing a short axis stack based on the cardiac anchor points provided by the segmented LV;
   determining a 3-chamber view scanning plane based on the cardiac anchor points provided by the segmented LV;
   detecting landmarks in a mid-ventricular short axis slice reconstructed from the 3D MRI volume and corresponding to a short axis slice prescribed in the short axis stack;
   determining a 2-chamber view scanning plane based on the landmarks detected in the reconstructed mid-ventricular short axis slice; and
   determining a 4-chamber view scanning plane based on the landmarks detected in the reconstructed mid-ventricular short axis slice.

2. The method of claim 1, wherein the step of prescribing a short axis stack based on the cardiac anchor points provided by the segmented LV comprises:
   detecting an LV apex and an LV base center in the 3D MRI volume based on the segmented LV;
   detecting a LV long axis connecting the LV base center and the LV apex; and
   prescribing a series of short axis slices perpendicular to the LV long axis and ranging between the LV base center and the LV apex.

3. The method of claim 2, wherein the step of segmenting a left ventricle (LV) in the 3D MRI volume comprises fitting an LV mesh model to the 3D MRI volume, and the step of detecting an LV apex and an LV base center in the 3D MRI volume based on the segmented LV comprises:
   detecting the LV apex at a vertex of the LV mesh model corresponding to the LV apex; and
   detecting the LV base center as a centroid of a plurality of vertices of the LV mesh model corresponding to the LV base.

4. The method of claim 1, wherein the step of segmenting a left ventricle (LV) in the 3D MRI volume comprises fitting an LV mesh model to the 3D MRI volume, the mesh model including an LV endocardium, an LV epicardiaum, and a left ventricle outflow tract (LVOT), and the step of determining a 3-chamber view scanning plane based on the cardiac anchor points provided by the segmented LV comprises:
determining the 3-chamber view scanning plane as a plane defined by an LV apex, LV base, and the LVOT provided by the LV mesh model.

5. The method of claim 1, wherein the step of detecting landmarks in a mid-ventricular short axis slice reconstructed from the 3D MRI volume and corresponding to a short axis slice prescribed in the short axis stack comprises:
detecting anterior and posterior right ventricle (RV) insertion points and a RV lateral point in the reconstructed mid-ventricular short axis slice.

6. The method of claim 5, wherein the step of detecting anterior and posterior right ventricle (RV) insertion points and a RV lateral point in the reconstructed mid-ventricular short axis slice comprises:
detecting a first bounding box defining positions of the anterior and posterior RV insertion points using a first series of trained detectors; and
detecting a second bounding box defining a position of the RV lateral point using a second series of trained detectors.

7. The method of claim 5, wherein the step of determining a 2-chamber view scanning plane based on the landmarks detected in the reconstructed mid-ventricular short axis slice comprises:
determining the 2-chamber view scanning plane to be a plane that is parallel to a line connecting the anterior and posterior RV insertion points and crossing an LV apex and a LV blood pool center that lies on the reconstructed mid-ventricular short axis slice, wherein the LV apex and the LV blood pool center are provided by the segmented LV.

8. The method of claim 5, wherein the step of determining a 4-chamber view scanning plane based on the landmarks detected in the reconstructed mid-ventricular short axis slice comprises:
determining the 4-chamber view scanning plane to be a plane that crosses an LV blood pool center, an LV apex, and the RV lateral point, wherein the LV apex and the LV blood pool center are provided by the segmented LV.

9. The method of claim 1, wherein the step of segmenting a left ventricle (LV) in the 3D MRI volume comprises:
detecting a position, orientation, and scale of the LV in the 3D MRI volume to fit an LV mesh model to the 3D MRI volume using a series of trained detectors; and
deforming boundaries of the LV mesh model in the 3D MRI volume using a trained boundary detector.

10. The method of claim 1, further comprising:
acquiring the 3D MRI volume as a single breath-hold acquisition using parallel MR imaging.

11. The method of claim 1, further comprising:
performing a cardiac MRI diagnostic scan using the automatically generated scan prescription.

12. An apparatus for automated view planning for cardiac magnetic resonance imaging (MRI) acquisition based on a single 3D MRI volume, comprising:
means for segmenting a left ventricle (LV) in the 3D MRI volume; and
means for automatically generating a scan prescription for cardiac MRI acquisition based on cardiac anchor points provided by the segmented LV in the 3D MRI volume, wherein the means for automatically generating a scan prescription for cardiac MRI acquisition based on cardiac anchor points provided by the segmented LV in the 3D MRI volume comprises:

means for prescribing a short axis stack based on the cardiac anchor points provided by the segmented LV;
means for determining a 3-chamber view scanning plane based on the cardiac anchor points provided by the segmented LV;
means for detecting landmarks in a mid-ventricular short axis slice reconstructed from the 3D MRI volume and corresponding to a short axis slice prescribed in the short axis stack;
means for determining a 2-chamber view scanning plane based on the landmarks detected in the reconstructed mid-ventricular short axis slice; and
means for determining a 4-chamber view scanning plane based on the landmarks detected in the reconstructed mid-ventricular short axis slice.

13. The apparatus of claim 12, wherein the means for prescribing a short axis stack based on the cardiac anchor points provided by the segmented LV comprises:
means for detecting an LV apex and an LV base center in the 3D MRI volume based on the segmented LV;
means for detecting a LV long axis connecting the LV base center and the LV apex; and
means for prescribing a series of short axis slices perpendicular to the LV long axis and ranging between the LV base center and the LV apex.

14. The apparatus of claim 13, wherein the means for segmenting a left ventricle (LV) in the 3D MRI volume comprises means for fitting an LV mesh model to the 3D MRI volume, and the means for detecting an LV apex and an LV base center in the 3D MRI volume based on the segmented LV comprises:
means for detecting the LV apex at a vertex of the LV mesh model corresponding to the LV apex; and
means for detecting the LV base center as a centroid of a plurality of vertices of the LV mesh model corresponding to the LV base.

15. The apparatus of claim 12, wherein the means for segmenting a left ventricle (LV) in the 3D MRI volume comprises means for fitting an LV mesh model to the 3D MRI volume, the mesh model including an LV endocardium, an LV epicardiaum, and a left ventricle outflow tract (LVOT), and the means for determining a 3-chamber view scanning plane based on the cardiac anchor points provided by the segmented LV comprises:
means for determining the 3-chamber view scanning plane as a plane defined by an LV apex, LV base, and the LVOT provided by the LV mesh model.

16. The apparatus of claim 12, wherein the means for detecting landmarks in a mid-ventricular short axis slice reconstructed from the 3D MRI volume and corresponding to a short axis slice prescribed in the short axis stack comprises:
means for detecting anterior and posterior right ventricle (RV) insertion points and a RV lateral point in the reconstructed mid-ventricular short axis slice.

17. The apparatus of claim 16, wherein the means for detecting anterior and posterior right ventricle (RV) insertion points and a RV lateral point in the reconstructed mid-ventricular short axis slice comprises:
means for detecting a first bounding box defining positions of the anterior and posterior RV insertion points using a first series of trained detectors; and
means for detecting a second bounding box defining a position of the RV lateral point using a second series of trained detectors.

18. The apparatus of claim 16, wherein the means for determining a 2-chamber view scanning plane based on the landmarks detected in the reconstructed mid-ventricular short axis slice comprises:
  means for determining the 2-chamber view scanning plane to be a plane that is parallel to a line connecting the anterior and posterior RV insertion points and crossing an LV apex and a LV blood pool center that lies on the reconstructed mid-ventricular short axis slice, wherein the LV apex and the LV blood pool center are provided by the segmented LV.

19. The apparatus of claim 16, wherein the means for determining a 4-chamber view scanning plane based on the landmarks detected in the reconstructed mid-ventricular short axis slice comprises:
  means for determining the 4-chamber view scanning plane to be a plane that crosses an LV blood pool center, an LV apex, and the RV lateral point, wherein the LV apex and the LV blood pool center are provided by the segmented LV.

20. The apparatus of claim 12, wherein the means for segmenting a left ventricle (LV) in the 3D MRI volume comprises:
  means for detecting a position, orientation, and scale of the LV in the 3D MRI volume to fit an LV mesh model to the 3D MRI volume using a series of trained detectors; and
  means for deforming boundaries of the LV mesh model in the 3D MRI volume using a trained boundary detector.

21. The apparatus of claim 12, further comprising:
  means for acquiring the 3D MRI volume as a single breath-hold acquisition using parallel MR imaging.

22. The apparatus of claim 12, further comprising:
  means for performing a cardiac MRI diagnostic scan using the automatically generated scan prescription.

23. A non-transitory computer readable medium encoded with computer executable instructions for automated view planning for cardiac magnetic resonance imaging (MRI) acquisition based on a single 3D MRI volume, the computer executable instructions defining steps comprising:
  segmenting a left ventricle (LV) in the 3D MRI volume; and
  automatically generating a scan prescription for cardiac MRI acquisition based on cardiac anchor points provided by the segmented LV in the 3D MRI volume, wherein the computer executable instructions defining the step of automatically generating a scan prescription for cardiac MRI acquisition based on cardiac anchor points provided by the segmented LV in the 3D MRI volume comprise computer executable instructions defining the steps of:
  prescribing a short axis stack based on the cardiac anchor points provided by the segmented LV;
  determining a 3-chamber view scanning plane based on the cardiac anchor points provided by the segmented LV;
  detecting landmarks in a mid-ventricular short axis slice reconstructed from the 3D MRI volume and corresponding to a short axis slice prescribed in the short axis stack;
  determining a 2-chamber view scanning plane based on the landmarks detected in the reconstructed mid-ventricular short axis slice; and
  determining a 4-chamber view scanning plane based on the landmarks detected in the reconstructed mid-ventricular short axis slice.

24. The non-transitory computer readable medium of claim 23, wherein the computer executable instructions defining the step of prescribing a short axis stack based on the cardiac anchor points provided by the segmented LV comprise computer executable instructions defining the steps of:
  detecting an LV apex and an LV base center in the 3D MRI volume based on the segmented LV;
  detecting a LV long axis connecting the LV base center and the LV apex; and
  prescribing a series of short axis slices perpendicular to the LV long axis and ranging between the LV base center and the LV apex.

25. The non-transitory computer readable medium of claim 24, wherein the computer executable instructions defining the step of segmenting a left ventricle (LV) in the 3D MRI volume comprise computer executable instructions defining the step of fitting an LV mesh model to the 3D MRI volume, and the computer executable instructions defining the step of detecting an LV apex and an LV base center in the 3D MRI volume based on the segmented LV comprise computer executable instructions defining the steps of:
  detecting the LV apex at a vertex of the LV mesh model corresponding to the LV apex; and
  detecting the LV base center as a centroid of a plurality of vertices of the LV mesh model corresponding to the LV base.

26. The non-transitory computer readable medium of claim 23, wherein the computer executable instructions defining the step of segmenting a left ventricle (LV) in the 3D MRI volume comprise computer executable instructions defining the step of fitting an LV mesh model to the 3D MRI volume, the mesh model including an LV endocardium, an LV epicardiaum, and a left ventricle outflow tract (LVOT), and the computer executable instructions defining the step of determining a 3-chamber view scanning plane based on the cardiac anchor points provided by the segmented LV comprise computer executable instructions defining the step of:
  determining the 3-chamber view scanning plane as a plane defined by an LV apex, LV base, and the LVOT provided by the LV mesh model.

27. The non-transitory computer readable medium of claim 23, wherein the computer executable instructions defining the step of detecting landmarks in a mid-ventricular short axis slice reconstructed from the 3D MRI volume and corresponding to a short axis slice prescribed in the short axis stack comprise computer executable instructions defining the steps of:
  detecting anterior and posterior right ventricle (RV) insertion points and a RV lateral point in the reconstructed mid-ventricular short axis slice.

28. The non-transitory computer readable medium of claim 27, wherein the computer executable instructions defining the step of detecting anterior and posterior right ventricle (RV) insertion points and a RV lateral point in the reconstructed mid-ventricular short axis slice comprise computer executable instructions defining the steps of:
  detecting a first bounding box defining positions of the anterior and posterior RV insertion points using a first series of trained detectors; and
  detecting a second bounding box defining a position of the RV lateral point using a second series of trained detectors.

29. The non-transitory computer readable medium of claim 27, wherein the computer executable instructions defining the step of determining a 2-chamber view scanning plane based on the landmarks detected in the reconstructed mid-ventricular short axis slice comprise computer executable instructions defining the step of:
  determining the 2-chamber view scanning plane to be a plane that is parallel to a line connecting the anterior and posterior RV insertion points and crossing an LV apex and a LV blood pool center that lies on the reconstructed mid-ventricular short axis slice, wherein the LV apex and the LV blood pool center are provided by the segmented LV.

30. The non-transitory computer readable medium of claim 27, wherein the computer executable instructions defining the step of determining a 4-chamber view scanning plane based on the landmarks detected in the reconstructed mid-ventricular short axis slice comprise computer executable instructions defining the step of:

determining the 4-chamber view scanning plane to be a plane that crosses an LV blood pool center, an LV apex, and the RV lateral point, wherein the LV apex and the LV blood pool center are provided by the segmented LV.

31. The non-transitory computer readable medium of claim 23, wherein the computer executable instructions defining the step of segmenting a left ventricle (LV) in the 3D MRI volume comprise computer executable instructions defining the steps of:

detecting a position, orientation, and scale of the LV in the 3D MRI volume to fit an LV mesh model to the 3D MRI volume using a series of trained detectors; and deforming boundaries of the LV mesh model in the 3D MRI volume using a trained boundary detector.

* * * * *